Aug. 28, 1951                C. T. GARRISON                2,565,726
                    HEAT COLLECTING AND DISTRIBUTING PLATE
                            Filed July 26, 1949
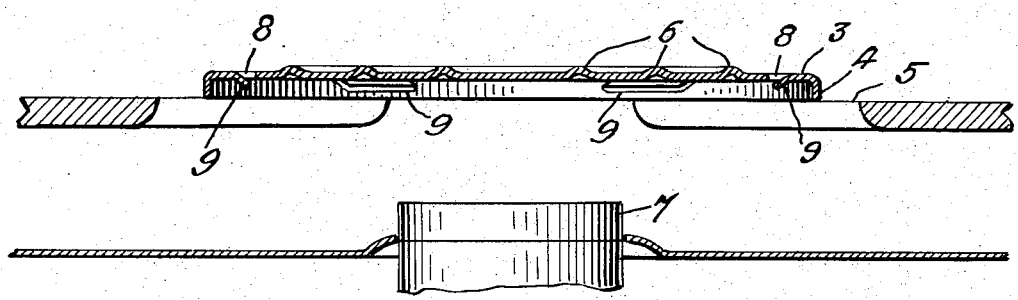
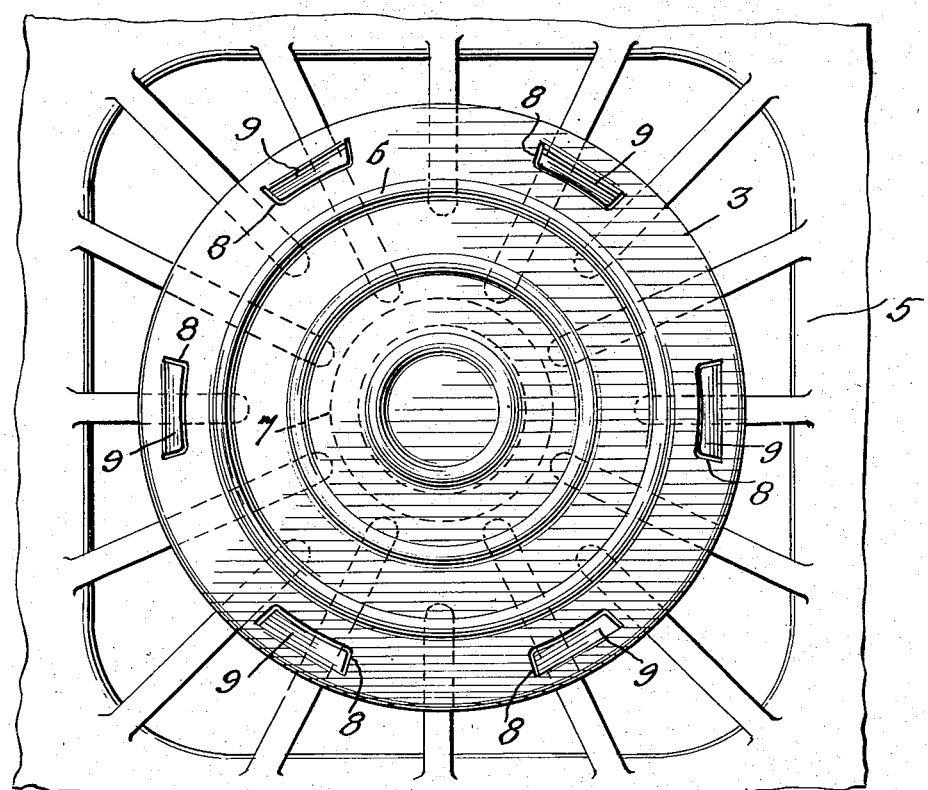
INVENTOR.
CHARLES T. GARRISON
BY
ATTORNEY Patented Aug. 28, 1951

2,565,726

UNITED STATES PATENT OFFICE 2,565,726

HEAT COLLECTING AND DISTRIBUTING PLATE

Charles T. Garrison, Sewickley, Pa.

Application July 26, 1949, Serial No. 106,919

1 Claim. (Cl. 126—215)

The invention here disclosed is a device for use on gas stoves to collect and distribute the heat, and the general objects of the invention are to provide such a device in the form of a plate which can be placed over an ordinary gas burner and which will absorb the heat direct from the flame and apply it uniformly to a pot, pan or other form of cooking utensil supported thereon.

Particularly it is a purpose of the invention to supply this article in a simple, inexpensive form, which will not take up space over the gas stove and which in addition to equalizing heat transfer will protect the cooking vessel against the carbonizing tendency of the gas flame.

Further special objects of the invention are to provide the heat collector and distributor in a form which will not warp or get out of shape from subjection to alternate heating and cooling and which will be easily kept clean and be free of any formation that might tend to collect material that might boil over.

Other desirable objects attained by the invention and the novel features of construction constituting the invention are set forth or will appear in the course of the following specification.

The drawing accompanying and forming part of the specification illustrates one of the present commercial embodiments of the invention. This, however, is subject to modification in various respects, all within the true intent and proper scope of the invention as hereinafter defined and claimed.

Fig. 1 in the drawing is a broken vertical sectional view showing the device in use on an ordinary gas stove;

Fig. 2 is a plan view of the same.

As shown in these views, the device is a one-piece plate 3 of circular outline having a dependent annular rim 4 for supporting it in slightly raised relation on the grill structure 5 of the stove.

This plate is a single piece of metal of high thermal conductivity such as copper or carbon steel. The latter, because of its lower cost, may generally be preferred.

The top of the plate is shown as having annular, ring embossments 6 both to reinforce the plate against warping and to assure adequate direct contact with the bottom of a pot or pan placed on the plate.

When placed directly over the burner 7, as indicated in Fig. 1, the plate will to an extent confine and hold the flame from the burner, absorbing and distributing the heat from the fuel substantially uniformly. This equalized heat is transmitted directly to the pot bottom, eliminating hot spots and preventing unequal cooking and burning of food.

This collection and equalization of the heat enables saving in fuel, since as soon as the plate becomes properly heated the burner may usually be turned down to an appreciable extent without loss of cooking time or effect.

To prevent discoloration of the cooking vessel, the plate is shown as having outwardly directed vents 8 in the outer rim portion of the same, these being formed, in the illustration, by partially severing and bending downwardly and inwardly the inclined tongues or flanges 9.

With this construction, part of the flame products are allowed to escape through the top of the plate and in so doing are diverted outwardly, thus to deflect any flame products about the rim of the plate away from contact with the sides or bottom portion of the pot. This is an important item for aluminum ware, enamel ware and the like.

The angularly turned edge flange reinforces the plate structure and aids in the collection and uniform distribution of heat.

The metal employed may vary in thickness. In the case of carbon steel 18 to 22 gage may be preferred. In such metal this thickness is sufficient to serve the desired heat collecting and transmitting qualities and to largely provide the effect of the copper heat collectors provided on some of the more expensive stainless steel cooking vessels.

The simplicity of structure and freedom from protuberances, crevices, and the like prevents collection of foreign matter such as might result from boiling-over pots, and enables the article to be easily kept clean. The device occupies but small space on top of the stove and is not in the way of other cooking operations.

It may be used with any cooking fuels, particularly such as gas, oil or coal.

In addition to actual cooking purposes, the device may be used as a hot plate for casserole dishes or for warming over foods. Also, it may be used to replace double boilers. In addition to protecting food against scorching, burning or sticking to the pots or pans, the device actually insures the production of more digestible food products along with the more efficient and economical use of fuel.

What is claimed is:

A plate for collecting, evenly distributing and directly conducting the heat from a gas burner or the like to the bottom of a cooking vessel, comprising a single, continuous piece of thick, heavy gage, pressed sheet metal of high thermal capacity and heat conductivity having a flat top portion and a dependent, angularly projecting, annular supporting flange about the rim of the same, said flat top portion having low, imperforate embossments for heat conducting contact with the flat bottom of a cooking vessel and shallow, closed, dead air spaces between said embossments forming areas in close heat radiating relation to the bottom of a vessel in heat conducting engagement on said embossments, said flat top portion being imperforate except for slots near the rim of the same and having downwardly and inwardly inclined lips along the outer edges for deflecting flame confined within the rim of the plate radially outwardly up through the top of the plate away from contact with the bottom of a vessel supported on the plate and forming guides for properly inclining a lifter inserted for raising the plate.

CHARLES T. GARRISON.

REFERENCES CITED

The following references are of record in the file of this patent:

UNITED STATES PATENTS

| Number | Name | Date |
|---|---|---|
| 1,164,066 | Burleson | Dec. 14, 1915 |
| 1,392,868 | Cruickshank | Oct. 4, 1921 |
| 1,785,182 | Coulston | Dec. 16, 1930 |